United States Patent
Ma et al.

(10) Patent No.: US 12,151,613 B2
(45) Date of Patent: Nov. 26, 2024

(54) ANTI-COLLISION WARNING SYSTEM FOR VEHICLE DOOR, VEHICLE WINDOW GLASS STRUCTURE, AND ANTI-COLLISION WARNING METHOD FOR VEHICLE DOOR

(71) Applicant: SAINT-GOBAIN GLASS FRANCE, Courbevoie (FR)

(72) Inventors: Siteng Ma, Shanghai (CN); Simon Le Moal, Pantin (FR); Xiaofeng Guo, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 289 days.

(21) Appl. No.: 17/605,143

(22) PCT Filed: Apr. 23, 2020

(86) PCT No.: PCT/CN2020/086299
§ 371 (c)(1),
(2) Date: Oct. 20, 2021

(87) PCT Pub. No.: WO2020/216272
PCT Pub. Date: Oct. 29, 2020

(65) Prior Publication Data
US 2022/0203892 A1  Jun. 30, 2022

(30) Foreign Application Priority Data
Apr. 25, 2019  (CN) .............................. 201910337170

(51) Int. Cl.
*B60Q 9/00* (2006.01)
*B60R 1/22* (2022.01)
*G06V 20/58* (2022.01)

(52) U.S. Cl.
CPC ................ *B60Q 9/008* (2013.01); *B60R 1/22* (2022.01); *B60R 2300/205* (2013.01); *G06V 20/58* (2022.01)

(58) Field of Classification Search
None
See application file for complete search history.

(56) References Cited

U.S. PATENT DOCUMENTS 9,688,199 B2 *  6/2017  Koravadi ................ G01S 19/42
9,845,048 B1 * 12/2017  Tseng ..................... B60Q 1/525
(Continued)

FOREIGN PATENT DOCUMENTS

CN    102837653 A    12/2012
CN    202966134 U     6/2013
(Continued)

OTHER PUBLICATIONS

International Search Report as issued in International Patent Application No. PCT/CN2020/086299, dated Jun. 30, 2020.
(Continued)

*Primary Examiner* — Muhammad Adnan
(74) *Attorney, Agent, or Firm* — Pillsbury Winthrop Shaw Pittman LLP (57) ABSTRACT

An anti-collision warning system for a vehicle door includes a sensing module, a detection module, and a warning module. The sensing module is configured to sense whether a passenger has an intention to open a vehicle door and output a sensing result. The control module is coupled to the sensing module, the detection module and warning module, and the control module is configured to control the warning module to issue an alert based on information on traffic conditions from the detection module in response to the sensing result being YES. The anti-collision warning system can issue an alert to the passenger in a timely and effective
(Continued)

manner when it senses that the passenger has the intention to open the vehicle door. Therefore, the passenger would be alerted and determine whether it is an appropriate time to open the vehicle door, thus preventing the vehicle door from colliding with an object.

17 Claims, 8 Drawing Sheets

(56) References Cited

U.S. PATENT DOCUMENTS

| | | | | |
|---|---|---|---|---|
| 10,960,246 | B2* | 3/2021 | Stadler | A62C 3/16 |
| 11,027,528 | B2* | 6/2021 | Laluet | B32B 17/10174 |
| 2013/0100287 | A1* | 4/2013 | Chien | G08G 1/167 |
| | | | | 348/148 |
| 2016/0300473 | A1* | 10/2016 | Chen | B60Q 9/008 |
| 2017/0041816 | A1* | 2/2017 | Cho | H04W 24/08 |
| 2018/0093631 | A1* | 4/2018 | Lee | B60W 40/08 |
| 2018/0137701 | A1* | 5/2018 | Padgett | G07C 9/00904 |
| 2018/0147965 | A1* | 5/2018 | Wang | B60N 3/023 |
| 2018/0290622 | A1* | 10/2018 | Mori | G08B 21/00 |
| 2019/0056546 | A1* | 2/2019 | Vrehen | G02B 6/0085 |
| 2020/0148108 | A1* | 5/2020 | Kumashiro | B60Q 9/008 |
| 2020/0276792 | A1* | 9/2020 | Laluet | B32B 17/10174 |
| 2020/0384948 | A1* | 12/2020 | Toyooka | H04Q 9/00 |
| 2021/0253063 | A1* | 8/2021 | Pupillo | B60Q 1/46 |
| 2022/0105899 | A1* | 4/2022 | Ueno | B60R 1/26 |
| 2022/0410799 | A1* | 12/2022 | Saitoh | B60Q 3/70 |

FOREIGN PATENT DOCUMENTS

| | | | |
|---|---|---|---|
| CN | 105984376 | A * | 10/2016 |
| CN | 106143292 | A | 11/2016 |
| CN | 106394395 | A | 2/2017 |
| CN | 106864368 | A | 6/2017 |
| CN | 108016353 | A | 5/2018 |

OTHER PUBLICATIONS

Second Office Action as issued in Chinese Patent Application No. 201910337170.1, dated Aug. 27, 2023.

* cited by examiner

ANTI-COLLISION WARNING SYSTEM FOR VEHICLE DOOR, VEHICLE WINDOW GLASS STRUCTURE, AND ANTI-COLLISION WARNING METHOD FOR VEHICLE DOOR

CROSS-REFERENCE TO RELATED APPLICATIONS

This application is the U.S. National Stage of PCT/CN2020/086299, filed Apr. 23, 2020, which in turn claims priority to Chinese patent application number 201910337170.1 filed Apr. 25, 2019. The content of these applications are incorporated herein by reference in their entireties.

RELATED FIELD

The present disclosure relates to the field of vehicle safety, in particular to an anti-collision warning system for a vehicle door, a vehicle window glass structure, and an anti-collision warning method for a vehicle door.

BACKGROUND

With the gradual popularization of vehicles, vehicle safety has become an increasing concern. In recent years, collision accidents between a front vehicle and a motorcycle, an electric vehicle, or a bicycle that approaches quickly from behind often occur when the door of the front vehicle is opened, which not only causes property loss, but also may cause personal injury and even death.

For safety reasons, after a vehicle is parked by a side of a road, passengers should observe traffic conditions behind them, such as whether there are vehicles moving forward, through a rearview mirror or by turning their heads backwards before opening the door. However, in reality, passengers sometimes forget to look at the rearview mirror. Moreover, for the passengers in the rear row, due to the limitation of viewing angles, they can only observe the traffic conditions behind them by turning their heads backwards, rather than through the rearview mirror. Since turning heads backwards does not comply with ergonomics, passengers in the rear row are more likely to forget to observe.

In some schemes, systems for delayed and safe opening of a vehicle door are proposed, which remind passengers by delaying the opening of the vehicle door. However, these control systems may sometimes misjudge. In addition, in the event of an accident, if the system for delayed opening of the vehicle door malfunctions, passengers may be locked inside the vehicle.

Therefore, how to promptly, safely, and effectively remind the passenger to prevent collision of the passenger and an object upon the opening of the vehicle door when the passenger wants to open the vehicle door has become one of the problems to be urgently solved by those skilled in the art.

SUMMARY

According to a first aspect of the present disclosure, an anti-collision warning system for a vehicle door is provided. The anti-collision warning system for a vehicle door includes:
a sensing module configured to sense whether a passenger has an intention to open the vehicle door and output a sensing result;
a detection module configured to collect information on traffic conditions;
a warning module configured to issue an alert to the passenger; and
a control module coupled to the sensing module, the detection module and the warning module and configured to control the warning module to issue the alert based on the information on current traffic conditions from the detection module in response to the sensing result being YES.

The anti-collision warning system for a vehicle door according to the present disclosure can timely issue the alert to the passenger when sensing that the passenger has the intention to open the vehicle door. Therefore, the passenger can be prompted timely when the vehicle door is about to be opened.

According to the above technical concept, the present disclosure may further include any one or more of the following optional embodiments.

In some optional embodiments, the detection module includes an information collection unit configured to collect information on traffic conditions around the vehicle;
the warning module includes a prompting unit configured to issue a prompt to the passenger; and
the control module is coupled to the sensing module, the information collection unit, and the prompting unit, and is configured to: (a) in response to the sensing result being YES, determine whether it is an appropriate time to open the vehicle door based on the information on current traffic conditions around the vehicle from the information collection unit; and (b) in response to a determination result being NO, control the prompting unit to issue the prompt to the passenger.

The anti-collision warning system for a vehicle door according to the present disclosure can determine whether it is an appropriate time to open the vehicle door based on the collected information on current traffic conditions around the vehicle, and issue the prompt to the passenger. Therefore, the passenger can be prompted timely and accurately when the door is about to be opened.

In some optional embodiments, the detection module includes a video capture unit configured to capture a real-time video of traffic conditions around the vehicle;
the warning module includes a display unit arranged on door glass or quarter-window glass and configured to display the real-time video of traffic conditions around the vehicle; and
the control module is coupled to the sensing module, the video capture unit and the display unit, and is configured to control the display unit to display the real-time video of traffic conditions around the vehicle in response to the sensing result being YES.

The inventors of the present invention have found through research that, when the passengers intend to open the vehicle door, they mainly have sight of the front door glass, the rear door glass, or the quarter-window glass. Therefore, the front door glass, the rear door glass, and the quarter-window glass are the most conspicuous areas for reminding passengers. The anti-collision warning system for a vehicle door according to the present disclosure can ensure that passengers inside the vehicle fully notice objects outside the vehicle by providing the display unit at these positions.

Through the real-time video of the traffic conditions around the vehicle displayed on the display unit, passengers can see the nature, size, or shape of the object, so as to further judge by themselves whether it is an appropriate time to open the door, thereby avoiding possible misjudgment of the control module.

In some optional embodiments, the detection module includes an information collection unit configured to collect information on traffic conditions around the vehicle;

the detection module further includes a video capture unit configured to capture a real-time video of traffic conditions around the vehicle;

the warning module includes a prompting unit configured to issue a prompt to the passenger;

the warning module further includes a display unit arranged on door glass or quarter-window glass and configured to display the real-time video of traffic conditions around the vehicle; and     the control module is coupled to the sensing module, the information collection unit, the video capture unit, the prompting unit and the display unit, and is configured to:

(a) in response to the sensing result being YES, control the display unit to display the real-time video of traffic conditions around the vehicle;

(b) in response to the sensing result being YES, determine whether it is an appropriate time to open the vehicle door based on the information on current traffic conditions around the vehicle from the information collection unit; and     (c) in response to a determination result being NO, control the prompting unit to issue the prompt to the passenger.

Through the combination of the above display unit and prompting unit, passengers can get effective reminders and have their own judgments, which can not only avoid collisions between objects and the vehicle door, but also avoid possible misjudgments of the control module.

In some optional embodiments, the anti-collision warning system for a vehicle door further includes a door-state monitoring module. An output terminal of the door-state monitoring module is coupled to the control module. The control module is configured to receive monitoring information on a state of the vehicle door from the door-state monitoring module; and the control module is configured to output a control instruction to activate the anti-collision warning system for a vehicle door in response to the state of the vehicle door being closed.

In some optional embodiments, the anti-collision warning system for a vehicle door further includes a vehicle-speed monitoring module. An output terminal of the vehicle-speed monitoring module is coupled to the control module. The control module is configured to receive monitoring information on vehicle speed from the vehicle-speed monitoring module; and the control module is configured to output a control instruction to activate the anti-collision warning system for a vehicle door in response to the vehicle speed being lower than a preset speed.

In some optional embodiments, the sensing module is a sensor provided on a door handle.

In some optional embodiments, the sensor includes a capacitive proximity sensor and an IR proximity sensor.

In some optional embodiments, the display unit is a vehicle glass with a projection function.

In some optional embodiments, the vehicle glass with a projection function is a projection glass or a glass integrated with a display screen.

In some optional embodiments, the information collection unit is an ultrasonic radar, a millimeter-wave radar, an infrared sensor, or a LiDAR sensor.

In some optional embodiments, the information on traffic conditions around the vehicle includes any one or more of the following: presence or absence of an object on a rear side of the vehicle door, distance between the object and the vehicle door, forward speed of the object, and time the object takes to reach the vehicle door.

In some optional embodiments, the prompting unit is a light prompting unit, a sound prompting unit, or a seat vibration unit.

In some optional embodiments, the light prompting unit is a luminescent glass.

In some optional embodiments, the sound prompting unit is an in-vehicle speaker.

In summary, the anti-collision warning system for a vehicle door according to the present disclosure can promptly, safely and effectively remind passengers, so as to effectively avoid the aforementioned collisions of the vehicle door and objects when the vehicle door is opened.

According to a second aspect of the present disclosure, a vehicle window glass structure applied to the anti-collision warning system for a vehicle door is provided. The vehicle window glass structure includes:

a glass unit configured to issue an alert to a passenger; and     a first interface configured to be coupled to the control module;

wherein the control module is further coupled to the sensing module and the detection module; the sensing module is configured to sense whether the passenger has an intention to open the vehicle door and output a sensing result; the detection module is configured to collect information on traffic conditions; and the control module is configured to control the glass unit to issue the alert based on the information on current traffic conditions from the detection module in response to the sensing result being YES.

According to the above technical concept, the present disclosure may further include any one or more of the following optional embodiments.

In some optional embodiments, the detection module includes an information collection unit configured to collect information on traffic conditions around the vehicle;

the glass unit includes a light prompting unit configured to issue a light prompt to the passenger; and     the control module is coupled to the sensing module, the information collection unit, and the light prompting unit, and is configured to: (a) in response to the sensing result being YES, determine whether it is an appropriate time to open the vehicle door based on the information on current traffic conditions around the vehicle from the information collection unit; and (b) in response to a determination result being NO, control the light prompting unit to issue the light prompt to the passenger.

In some optional embodiments, the detection module includes a video capture unit configured to capture a real-time video of traffic conditions around the vehicle;

the glass unit includes a display unit arranged on door glass or quarter-window glass and configured to display the real-time video of traffic conditions around the vehicle; and     the control module is coupled to the sensing module, the video capture unit and the display unit, and is configured to control the display unit to display the real-time video of traffic conditions around the vehicle in response to the sensing result being YES.

In some optional embodiments, the detection module includes an information collection unit configured to collect information on traffic conditions around the vehicle and send the information on traffic conditions around the vehicle to the control module;

the detection module further includes a video capture unit configured to capture a real-time video of traffic conditions around the vehicle;

the glass unit includes a light prompting unit configured to issue a light prompt to the passenger;

the glass unit further includes a display unit arranged on door glass or quarter-window glass and configured to display the real-time video of traffic conditions around the vehicle; and the control module is coupled to the sensing module, the information collection unit, the video capture unit, the display unit and the prompting unit, and is configured to: (a) in response to the sensing result being YES, control the display unit to display the real-time video of traffic conditions around the vehicle; (b) in response to the sensing result being YES, determine whether it is an appropriate time to open the vehicle door based on the information on current traffic conditions around the vehicle from the information collection unit; and (c) in response to a determination result being NO, control the light prompting unit to issue the light prompt to the passenger.

In some optional embodiments, the warning module may further include a sound prompting unit and/or a seat vibration prompting unit.

According to a third aspect of the present disclosure, an anti-collision warning method for a vehicle door is provided, which is applied to the above-described anti-collision warning system for a vehicle door. The method includes the steps of:

receiving a sensing result on whether a passenger has an intention to open the vehicle door and information on traffic conditions; and outputting a control instruction to control issuance of an alert based on the obtained information on current traffic conditions in response to the sensing result being YES.

In some optional embodiments, the method includes the steps of:

receiving the sensing result on whether the passenger has the intention to open the vehicle door and information on traffic conditions around the vehicle;

determining whether it is an appropriate time to open the vehicle door based on the obtained information on current traffic conditions around the vehicle in response to the sensing result being YES; and outputting a control instruction to control issuance of a prompt in response to a determination result being NO.

In some optional embodiments, the method includes the steps of:

receiving the sensing result on whether the passenger has the intention to open the vehicle door and a real-time video of traffic conditions around the vehicle; and outputting a control instruction to control display of the real-time video of traffic conditions around the vehicle in response to the sensing result being YES.

In some optional embodiments, the method includes the steps of:

receiving the sensing result on whether the passenger has the intention to open the vehicle door, a real-time video of traffic conditions around the vehicle and information on traffic conditions around the vehicle;

outputting a control instruction to control display of the real-time video of traffic conditions around the vehicle in response to the sensing result being YES;

determining whether it is an appropriate time to open the vehicle door based on the obtained information on current traffic conditions around the vehicle in response to the sensing result being YES; and outputting a control instruction to control issuance of a prompt in response to a determination result being NO.

In some optional embodiments, the method further includes the steps of:

receiving monitoring information on a state of the vehicle door, and in response to the state of the vehicle door being closed, outputting a control instruction to activate the anti-collision warning system for a vehicle door; or receiving monitoring information on vehicle speed, and in response to the vehicle speed being lower than a preset speed, outputting a control instruction to activate the anti-collision warning system for a vehicle door.

According to a fourth aspect of the present disclosure, a computer device is provided, and the computer device includes a memory, a processor and instructions stored in the memory and executable by the processor. When the processor executes the instructions, the steps of the above-described anti-collision warning method for a vehicle door are implemented.

According to a fifth aspect of the present disclosure, a computer-readable storage medium is provided, on which executable instructions are stored. When the executable instructions are executed, a machine performs the steps of the above-described anti-collision warning method for a vehicle door.

BRIEF DESCRIPTION OF THE DRAWINGS

In order to better understand the principles, features, and advantages of the present disclosure, the present disclosure will be described in more detail in the following with reference to the drawings.

DETAILED DESCRIPTION

The present disclosure will be further described below with reference to the accompanying drawings so that those skilled in the art would fully understand the present disclosure. But it should be understood that the present disclosure is not limited to the embodiments disclosed below. It should be understood these embodiments are described to enable those skilled in the art to better understand and implement the subject matter described herein, and not to limit the scope, applicability, or embodiments set forth in the claims. Changes can be made to the function and arrangement of the modules and units described herein without departing from the scope of protection of the present disclosure. As for various embodiments, various modules and units may be omitted, replaced or added as needed. In addition, features described in some embodiments may also be combined in other embodiments.

In the present disclosure, a "real-time video of traffic conditions around a vehicle" refers to a real-time video of traffic conditions about people, vehicles, and other objects around the vehicle. In some embodiments, the video refers to a real-time video of traffic conditions in a direction which the vehicle door faces after the vehicle door is fully opened or the vehicle tail faces.

Similarly, the "information on traffic conditions around the vehicle" refers to the information on traffic conditions about people, vehicles, and other objects around the vehicle. In some embodiments, the information refers to information on traffic conditions in a direction which the vehicle door faces after the vehicle door is fully opened or the vehicle tail faces. The information includes, but is not limited to: presence or absence of an object on a rear side of the vehicle door, distance between the object and the vehicle door, forward speed of the object, and time the object takes to reach the vehicle door.

I. Anti-Collision Warning System for a Vehicle Door

Figure 1:
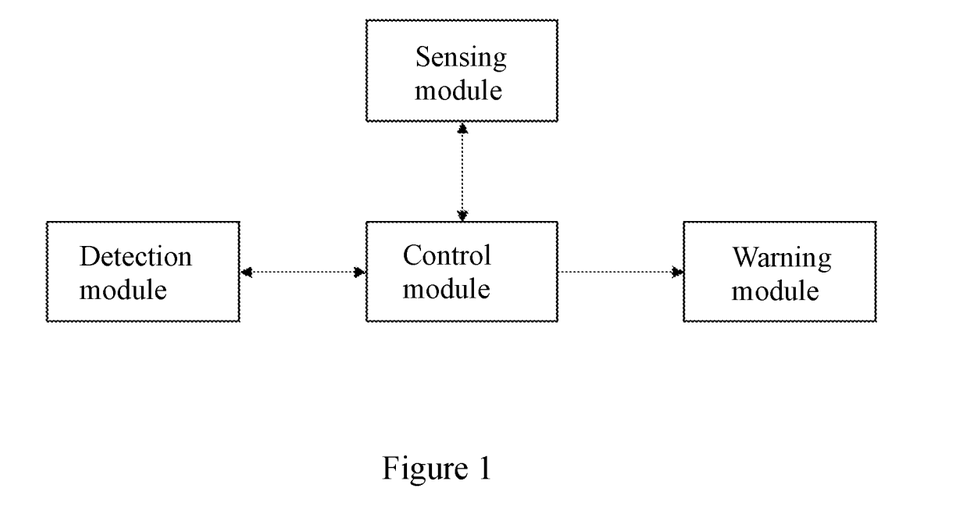
FIG. 1 is a schematic structural diagram of an anti-collision warning system for a vehicle door according to an embodiment of the present disclosure.
Figure 2:
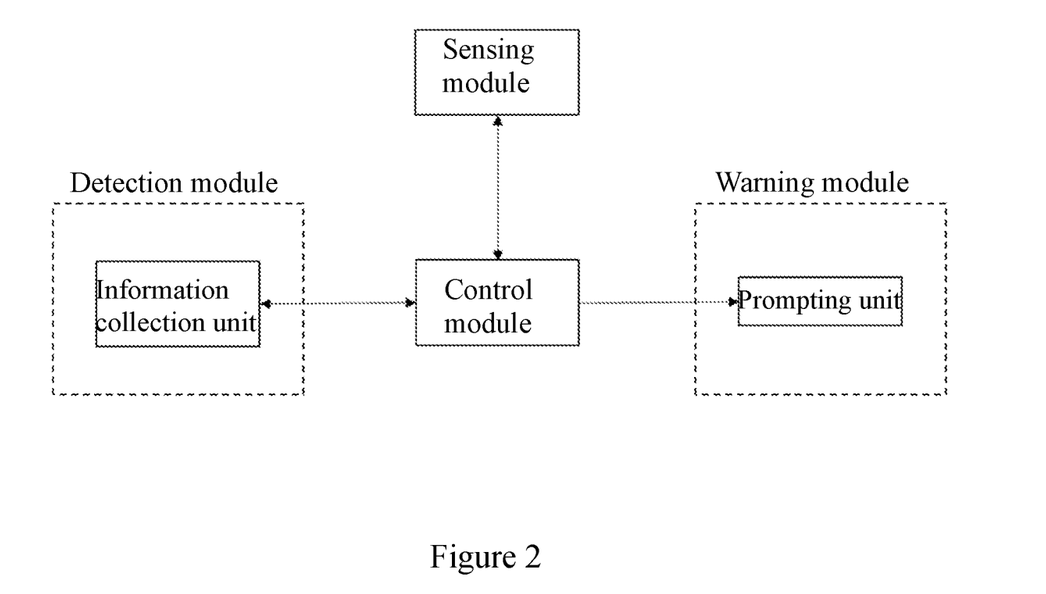
FIG. 2 is a schematic structural diagram of an anti-collision warning system for a vehicle door according to another embodiment of the present disclosure.
Figure 3:
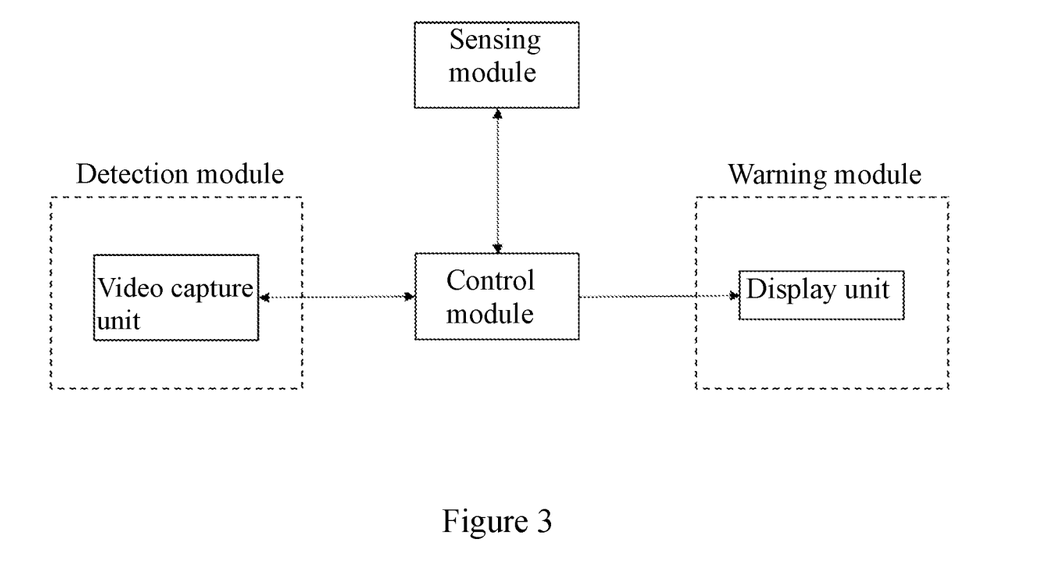
FIG. 3 is a schematic structural diagram of an anti-collision warning system for a vehicle door according to another embodiment of the present disclosure.
Figure 4:
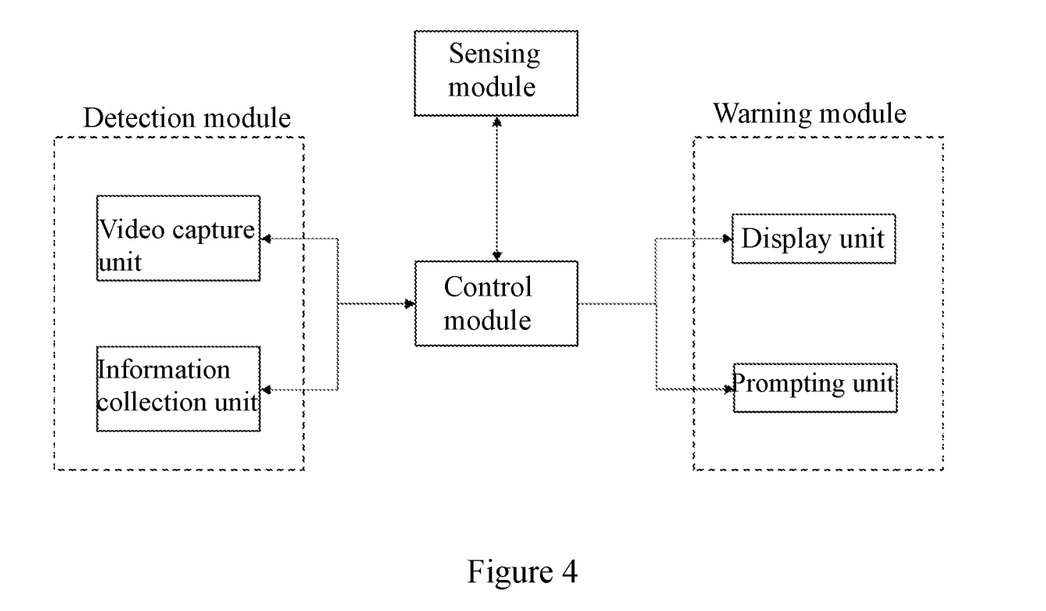
FIG. 4 is a schematic structural diagram of an anti-collision warning system for a vehicle door according to another embodiment of the present disclosure.
Figure 5:
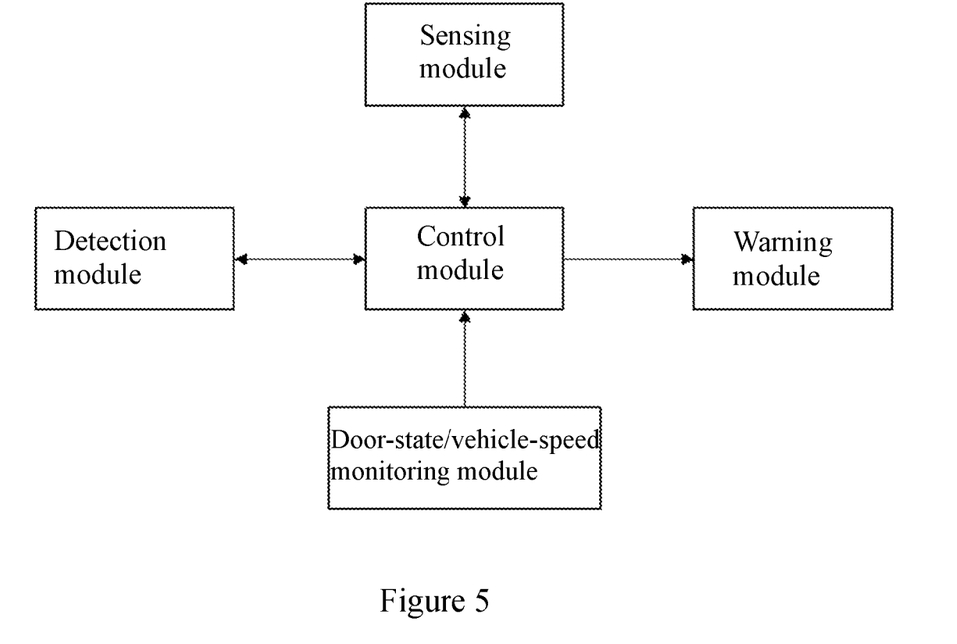
FIG. 5 is a schematic structural diagram of an anti-collision warning system for a vehicle door according to another embodiment of the present disclosure.

FIG. 1 shows an anti-collision warning system for a vehicle door according to an embodiment of the present disclosure, which includes a sensing module, a control module, a detection module, and a warning module. FIG. 2 shows an anti-collision warning system for a vehicle door according to another embodiment of the present disclosure, in which the detection module includes an information collection unit, and the warning module includes a prompting unit. FIG. 3 shows an anti-collision warning system for a vehicle door according to another embodiment of the present disclosure, in which the detection module includes a video capture unit, and the warning module includes a display unit. FIG. 4 shows an anti-collision warning system for a vehicle door according to another embodiment of the present disclosure, in which the detection module includes a video capture unit and an information collection unit, and the warning module includes a display unit and a prompting unit. FIG. 5 shows an anti-collision warning system for a vehicle door according to another embodiment of the present disclosure, which further includes a door-state monitoring module or a vehicle-speed monitoring module.

Each module and unit in the anti-collision warning system for a vehicle door according to the present disclosure will be further described below with reference to the accompanying drawings, so that those skilled in the art would fully understand the present disclosure.

Sensing Module

As shown in FIGS. 1 to 8, the sensing module is coupled to the control module; an output terminal of the sensing module is coupled to the control module; and the sensing module is configured to sense whether a passenger has an intention to open the vehicle door and output a sensing result. If the sensing module senses that the passenger has an intention to open the vehicle door, the sensing result will be YES, and the sensing result will be output to the control module. In response to the sensing result being NO, the sensing module will stay in sensing state.

In some embodiments, the sensing module is activated once the vehicle door is closed. In some other embodiments, the control module is configured to send a control instruction to the sensing module to activate the sensing module when it is detected that the vehicle speed is lower than 10 km/h.

How to determine whether the passenger has the intention to open the door is known to those skilled in the art. For example, when the passenger approaches the door handle or touches the door handle, the sensing result is YES. Optionally, a determination condition may be stored in a sensor in advance. For example, the determination condition may be as follows: when the distance between the passenger and the sensor is less than a predetermined distance threshold (for example, less than or equal to 2 cm), the sensing result is YES According to the present disclosure, there is no specific limitation on the type of the sensing module, and the sensing module may be a sensing device commonly used in the field, for example, may be a proximity sensor, which includes a capacitive proximity sensor and an IR (infrared) proximity sensor.

In addition, there is no specific limitation on the number and positions of the sensing modules in the present disclosure, as long as the number and installation positions of the sensing modules are suitable for sensing the intention of the passenger to open the door. In one embodiment, four sensing modules are provided, which are respectively arranged on four door handles or other suitable positions.

Detection Module

As shown in FIGS. 1 to 8, the detection module is coupled to the control module; an output terminal of the detection module is coupled to the control module; and the detection module is configured to collect information on traffic conditions.

In some embodiments, the detection module is activated once the vehicle door is closed. In some other embodiments, the control module is configured to send a control instruction to the detection module to activate the detection module when it is detected that the vehicle speed is lower than 10 km/h. In some other embodiments, the control module is configured to send a control instruction to the detection module to activate the detection module in response to the sensing result being YES.

Information Collection Unit

As shown in FIGS. 2 and 4, the detection module includes the information collection unit. The information collection unit is coupled to the control module; an output terminal of the information collection unit is coupled to the control module; and the information collection unit is configured to collect information on traffic conditions around the vehicle and send the information on traffic conditions around the vehicle to the control module.

The information on traffic conditions around the vehicle includes, but is not limited to: presence or absence of an object on a rear side of the vehicle door, distance between the object and the vehicle door, forward speed of the object, and time the object takes to reach the vehicle door.

There is no specific limitation on the type of the information collection unit in the present disclosure. For example, the information collection unit may be a sensor. The sensor usually includes a transmitting-receiving device and a signal processing device. The transmitting-receiving device is configured to transmit a signal, receive a signal reflected by a target object and output the received signal to the signal processing device. The signal processing device is configured to process the signal from the transmitting-receiving device, and calculate the presence or absence of an object on the rear side of the vehicle door, the distance between the object and the vehicle door, the forward speed of the object, and the time the object takes to reach the vehicle door based on the output signal.

There is no specific limitation on the type of the sensor in the present disclosure, as long as the sensor is capable of collecting the above-mentioned information on traffic conditions around the vehicle. For example, the sensor may be an ultrasonic radar, a millimeter-wave radar, an infrared sensor, or a LiDAR (light detection and ranging) sensor.

How to detect the information on traffic conditions around the vehicle (such as the presence or absence of an object on the rear side of the vehicle door, the distance between the object and the vehicle door, the forward speed of the object, and the time the object takes to reach the vehicle door) by a sensor is known to those skilled in the art. For example, the detection of the presence or absence of an object on the rear side of the vehicle door can be achieved by sending a sound wave signal and receiving a reflected sound wave signal by means of the radar. For the detection of the distance between the object and the vehicle door, the distance between the measured object and the vehicle door can be calculated by calculating the time difference between the time when the sound wave signal is sent and the time when the reflected sound wave signal is received in conjunction with the speed of propagation of the sound wave signal in the medium. For the detection of the forward speed of the object, whether the object is stationary or moving can be determined by making multiple measurements of the distance between the object and the vehicle door and determining whether the distances between the object and the vehicle door obtained in the multiple measurements are equal; furthermore, whether the object remains in place or is approaching the vehicle can be determined by comparing distances between the object and the vehicle door obtained in two measurements; furthermore, the forward speed of the object is calculated by the distances between the object and the vehicle door obtained in two measurements, and the time the object takes to reach the vehicle door is estimated based on the distance between the object and the vehicle door obtained in the last measurement and the calculated forward speed of the object.

The collection content and collection duration of the information collection unit may be set and stored in the information collection unit in advance. Those skilled in the art can make appropriate selections according to actual needs. For example, in some embodiments, the collection content is the presence or absence of an object on the rear side of the vehicle door, the distance between the object and the vehicle door, the forward speed of the object, and the time the object takes to reach the vehicle door. In some embodiments, the collection duration is 30 seconds.

In addition, there is no specific limitation on the number and positions of the sensors in the present disclosure. For example, one or more sensors may be provided, and may be arranged at a rearview mirror, the tail of the vehicle, or the roof of the vehicle or other suitable positions. In one embodiment of the present disclosure, two ultrasonic sensors are provided, and are respectively located on left and right rearview mirrors of the vehicle. In another embodiment of the present disclosure, four ultrasonic sensors are provided, and are respectively located at the left and right rearview mirrors of the vehicle and the left and right sides of the tail of the vehicle.

Video Capture Unit

As shown in FIGS. 3 and 4, the detection module includes the video capture unit configured to capture a real-time video of the traffic conditions around the vehicle.

In some embodiments, the video capture unit includes a shooting unit and a video processing unit. The shooting unit is configured to shoot a real-time video of traffic conditions around the vehicle and output the video to the video processing unit, and the video processing unit is configured to decode a signal output by the shooting unit and output it to the control module.

The shooting unit may be a camera, such as a Wi-Fi camera, for capturing the real-time video of traffic conditions around the vehicle. There is no specific limitation on the shooting angle, the shooting duration of the video capture unit in the present disclosure, as long as it is suitable for the passenger to observe the traffic conditions on the rear side of the vehicle door. The shooting angle and the shooting duration may be set and stored in the detection module in advance. Those skilled in the art can make appropriate selections according to actual needs. For example, in some embodiments, the shooting angle is the direction which the vehicle door faces when the vehicle door is opened or the vehicle tail faces. In some embodiments, the shooting duration is 30 seconds.

There is no specific limitation on the positions and number of the cameras, as long as the number and positions of the cameras are suitable for capturing the real-time videos of traffic conditions around the vehicle. For example, in one embodiment, one camera is provided, and is mounted on the roof of the vehicle. In another embodiment, two cameras are provided; a first camera is mounted to the left rearview mirror of the vehicle to capture the video of the traffic conditions behind the left front door; and a second camera is mounted to the right rearview mirror of the vehicle to capture the video of traffic conditions behind the right front door.

Warning Module

As shown in FIGS. 1 to 8, the warning module is coupled to the control module and is configured to issue an alert to the passenger.

Prompting Unit

As shown in FIGS. 2 and 4, the warning module includes the prompting unit configured to issue a prompt to the passenger. Specifically, the prompting unit is activated after receiving an instruction from the control module, and issues the prompt to the passenger.

The prompting unit may be a light prompting unit, such as a luminescent glass. The luminescent glass may be prepared by the steps of the following method: (a) embedding (organic or inorganic) lights (such as LED lights) to edges of glass; (b) printing enamel luminescent points on the glass; (c) integrating luminescent powder into the glass; and (d) integrating luminescent films into the glass. The luminescent glass may also be prepared by a scattering light source or prepared according to the principle of electroluminescence. The light prompting unit is configured to start blinking after being activated. The color of the light, the blinking pattern and the blinking duration may be set and stored in the light prompting unit in advance. Those skilled in the art can make appropriate selections according to actual needs. For example, in some embodiments, the light is a red LED or the like, and the blinking duration is 5 seconds.

There is no specific limitation on the position of the light prompting unit in the present disclosure, and the light prompting unit may be located on front door glass, rear door glass, and quarter-window glass. Furthermore, the light prompting unit may be provided on the front windshield or the rear windshield, so as to not only prompt the passengers inside the vehicle, but also prompt pedestrians outside the vehicle.

In addition, the prompting unit may be a sound prompting unit and/or a seat vibration prompting unit. The sound prompting unit may be an in-vehicle speaker. The sound prompting unit is configured to issue an alert sound after being activated. The sound type and duration of the alert sound may be set and stored in the sound prompting unit in advance. Those skilled in the art can make appropriate selections according to actual needs. For example, in some embodiments, the alert sound is a "beep" sound, and the duration is 5 seconds. The vibration type and the vibration duration of the seat vibration prompting unit may be set and stored in the seat vibration prompting unit in advance. Those skilled in the art can make appropriate selections according to actual needs.

Display Unit

As shown in FIGS. 3 and 4, the warning module includes the display unit. The display unit is arranged on door glass or quarter-window glass, and is configured to display the real-time video of traffic conditions around the vehicle.

In some embodiments, the display unit is activated after receiving an instruction from the control module, and displays the real-time video of the traffic conditions around the vehicle.

In some embodiments, the display unit may be directly connected to the video capture unit, and is configured to display the real-time video of traffic conditions around the vehicle output by the video capture unit on the door glass or quarter-window glass.

There is no specific limitation on the type of the display unit in the present disclosure, as long as the display unit is suitable for collecting the information on traffic conditions around the vehicle. The display unit may be a display screen integrated in the door glass, or a projection glass having an image display function. The display screen may be, for example, a flexible OLED display or an LCD display, which may be prepared by sandwiching the display into glass or attaching the display to a glass surface. The projection glass may be prepared by sandwiching a projection film into the glass or attaching the projection film to a glass surface. In one embodiment, the projection glass is prepared according to the Mie scattering principle. The projection glass is transparent in an inactive state, that is, the passenger would barely notice the difference between the projection glass and ordinary glass.

The display mode and display duration of the display unit may be set and stored in the display module in advance. Those skilled in the art can make appropriate selections according to actual needs. For example, in some embodiments, the display duration is 30 seconds.

There is no specific limitation on the positions and number of the display units. For example, in a preferred embodiment, at least four display units are provided; a first display unit is arranged on the left front door glass of the vehicle and is configured to display the view of the left rear side of the vehicle; a second display unit is arranged on the right front door glass of the vehicle and is configured to display the view of the right rear side of the vehicle; a third display unit is arranged on the left rear door glass of the vehicle and is configured to display the view of the left rear side of the vehicle; and a fourth display unit is arranged on the right rear door glass of the vehicle and is configured to display the view of the right rear side of the vehicle.

Control Module

As shown in FIGS. 1 to 8, the control module is coupled to the sensing module, the detection module, and the warning module, and is configured to control the warning module to issue an alert based on the information on current traffic conditions from the detection module in response to the sensing result being YES.

As shown in FIG. 2, the control module is coupled to the sensing module, the information collection unit, and the prompting unit, and is configured to: (a) in response to the sensing result being YES, determine whether it is an appropriate time to open the vehicle door based on the information on current traffic conditions around the vehicle from the information collection unit; and (b) in response to a determination result being NO, control the prompting unit to issue the prompt to the passenger.

As shown in FIG. 3, the control module is coupled to the sensing module, the video capture unit, and the display unit, and is configured to control the display unit to display the real-time video of traffic conditions around the vehicle in response to the sensing result being YES.

As shown in FIG. 4, the control module is coupled to the sensing module, the information collection unit, the video capture unit, the prompting unit, and the display unit, and is configured to:
  (a) in response to the sensing result being YES, control the display unit to display the real-time video of traffic conditions around the vehicle;
  (b) in response to the sensing result being YES, determine whether it is an appropriate time to open the vehicle door based on the information on current traffic conditions around the vehicle from the information collection unit; and
  (c) in response to a determination result being NO, control the prompting unit to issue the prompt to the passenger.

As shown in FIG. 5, the control module is coupled to the sensing module, the detection module, the warning module, and the door-state monitoring module or the vehicle-speed monitoring module, and is configured to:
  (a) in response to the state of the vehicle door being closed or the vehicle speed being lower than a preset speed, output a control instruction to activate the anti-collision warning system for a vehicle door;
  (b) in response to the sensing result being YES, control the display unit to display the real-time video of traffic conditions around the vehicle;
  (c) in response to the sensing result being YES, determine whether it is an appropriate time to open the vehicle door based on the information on current traffic conditions around the vehicle from the information collection unit; and
  (d) in response to a determination result being NO, control the prompting unit to issue the prompt to the passenger.

Figure 6:
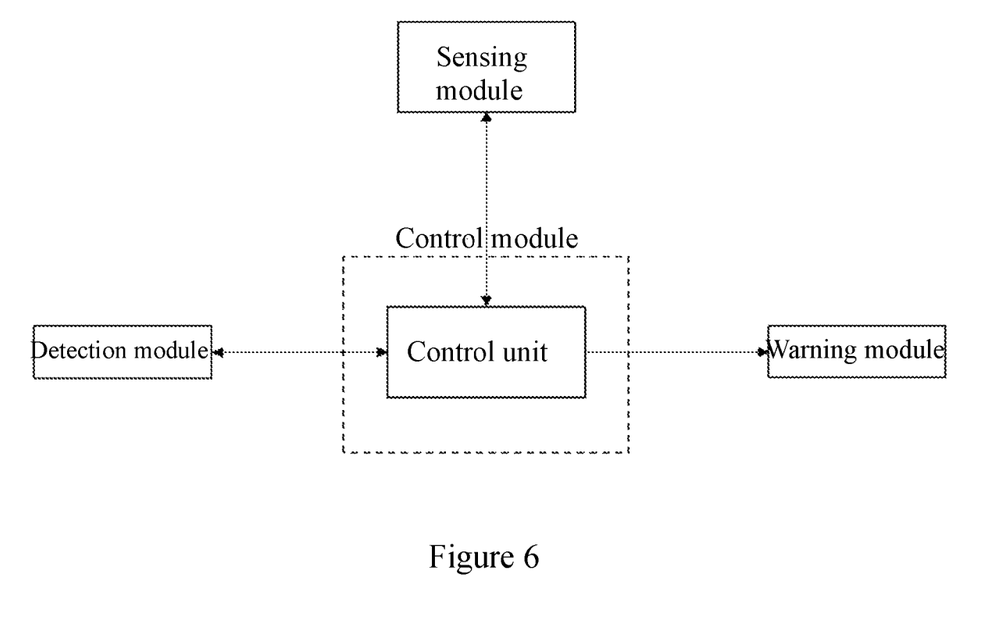
FIG. 6 is a schematic structural diagram of an anti-collision warning system for a vehicle door according to another embodiment of the present disclosure.

As shown in FIG. 6, the control module may be a chip including a control unit. The control unit is coupled to the sensing module. An output terminal of the control unit is coupled to the sensing module, the detection module, and the warning module, and the control unit is configured to control the warning module to issue an alert based on the information on traffic conditions from the detection module in response to the sensing result being YES.

Figure 7:
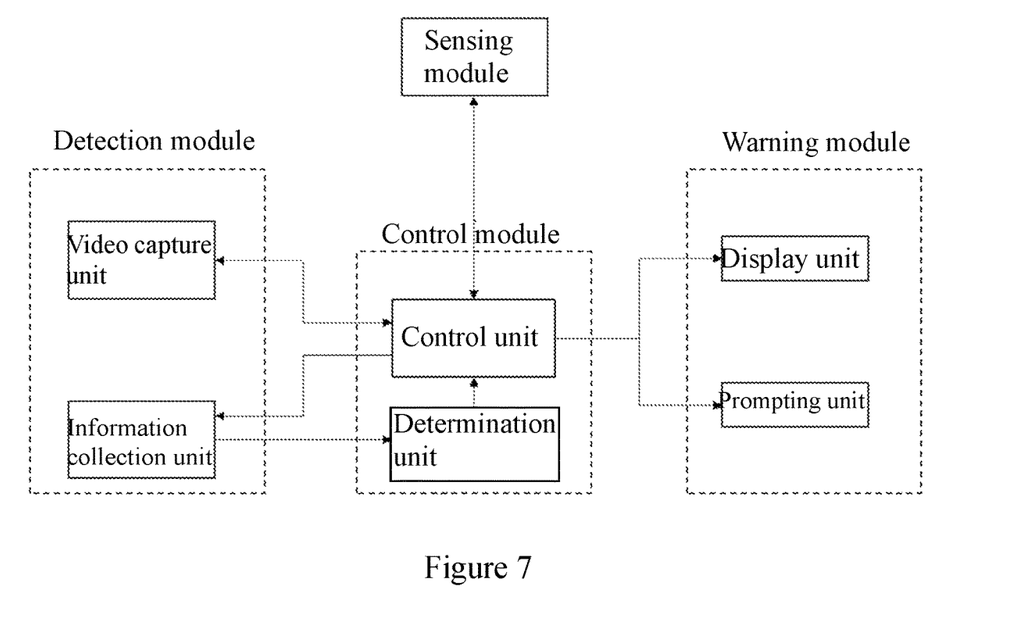
FIG. 7 is a schematic structural diagram of an anti-collision warning system for a vehicle door according to another embodiment of the present disclosure.

As shown in FIG. 7, the control module may be a chip including a determination unit and a control unit. The determination unit is coupled to the information collection unit, and an output terminal of the determination unit is coupled to the control unit; the control unit is coupled to the sensing module, the video capture unit and the determination unit, and an output terminal of the control unit is coupled to the sensing module, the video capture unit, the information collection unit, the display unit and the prompting unit. Further, the control module is configured to:
  (a) in response to the sensing result being YES, control the display unit to display the real-time video of traffic conditions around the vehicle;
  (b) in response to the sensing result being YES, determine whether it is an appropriate time to open the vehicle door based on the information on traffic conditions around the vehicle from the information collection unit; and
  (c) in response to a determination result being NO, control the prompting unit to issue the prompt to the passenger.

How to determine whether it is an appropriate time to open the vehicle door is known to those skilled in the art. For example, it may be achieved by storing a safety condition, such as a safety time threshold (for example, 10 seconds) for an object to reach the vehicle door, in the determination unit in advance. If the time the object takes to reach the vehicle door, returned by the detection module, is less than the safety time threshold, the detection unit determines that it is not an appropriate time to open the vehicle door and the determination result is NO. In response to the determination result being NO, the control unit sends a control instruction to the prompting unit to activate the prompting unit.

In addition, in the present disclosure, the control module may be any device having a suitable capability of information processing, such as a microcontroller, a microprocessor, and the like. The control unit generally includes a memory or is connected to a memory, and corresponding software programs and data are stored in the memory to ensure that the control module can perform the above functions.

In some embodiments, the control module may be integrated with the sensing module, the detection module, and the warning module. In some other embodiments, the control module may communicate with the sensing module, the detection module, and the warning module through a vehicle bus.

Door-State Monitoring Module

As shown in FIG. 5, in some embodiments, the anti-collision warning system for a vehicle door further includes a door-state monitoring module. An output terminal of the door-state monitoring module is coupled to the control module. The control module is configured to receive monitoring information on a state of the vehicle door from the door-state monitoring module; and the control module is configured to output a control instruction to activate the anti-collision warning system for a vehicle door in response to the state of the vehicle door being closed.

Vehicle-Speed Monitoring Module

As shown in FIG. 5, in some embodiments, the anti-collision warning system for a vehicle door further includes a vehicle-speed monitoring module. An output terminal of the vehicle-speed monitoring module is coupled to the control module. The control module is configured to receive monitoring information on vehicle speed from the vehicle-speed monitoring module; and the control module is configured to output a control instruction to activate the anti-collision warning system for a vehicle door in response to the vehicle speed being lower than a preset speed. Those skilled in the art may appropriately select the preset speed according to actual needs, such as 15 km/h, 10 km/h, 5 km/h, and the like.

Figure 8:
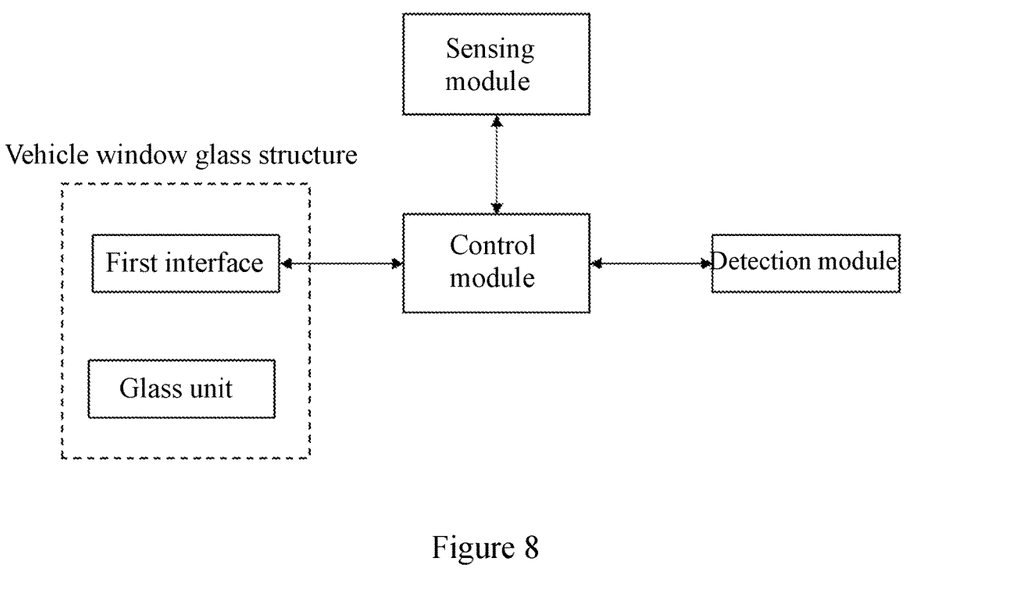
FIG. 8 is a schematic diagram of a vehicle window glass structure according to an embodiment of the present disclosure.

II. Vehicle Window Glass Structure for the Anti-Collision Warning System for a Vehicle Door As described above, the anti-collision warning system for a vehicle door includes the sensing module, the detection module, the warning module, and the control module. As shown in FIG. 8, the vehicle window glass structure includes:
  a glass unit configured to issue an alert to a passenger; and
  a first interface configured to be coupled to the control module;
  wherein the control module is further coupled to the sensing module and the detection module; the sensing module is configured to sense whether the passenger has an intention to open the vehicle door and output a sensing result; the detection module is configured to collect information on traffic conditions; and the control module is configured to control the glass unit to issue the alert based on the information on current traffic conditions from the detection module in response to the sensing result being YES.

In some other embodiments, the detection module includes an information collection unit configured to collect information on traffic conditions around the vehicle and send the information on traffic conditions around the vehicle to the control module;
  the glass unit includes a light prompting unit configured to issue a light prompt to the passenger; and
  the control module is coupled to the sensing module, the information collection unit, and the light prompting unit, and is configured to: (a) in response to the sensing result being YES, determine whether it is an appropriate time to open the vehicle door based on the information on current traffic conditions around the vehicle from the information collection unit; and (b) in response to a determination result being NO, control the light prompting unit to issue a prompt to the passenger.

In some specific embodiments, the light prompting unit is a luminescent glass.

In some other embodiments, the detection module includes a video capture unit configured to capture a real-time video of traffic conditions around the vehicle;
  the glass unit includes a display unit, which is arranged on door glass or quarter-window glass and configured to display the real-time video of traffic conditions around the vehicle; and
  the control module is coupled to the sensing module, the video capture unit and the display unit, and is configured to control the display unit to display the real-time video of traffic conditions around the vehicle in response to the sensing result being YES.

In some specific embodiments, the glass unit is glass with a projection function, such as projection glass or a glass integrated with a display screen.

In some other embodiments, the detection module includes an information collection unit configured to collect information on traffic conditions around the vehicle and send the information on traffic conditions around the vehicle to the control module;
  the detection module further includes a video capture unit configured to capture a real-time video of traffic conditions around the vehicle;

the glass unit includes a light prompting unit configured to issue a light prompt to the passenger;

the glass unit further includes a display unit, which is arranged on door glass or quarter-window glass and configured to display the real-time video of traffic conditions around the vehicle; and the control module is coupled to the sensing module, the information collection unit, the video capture unit, the display unit and the prompting unit, and is configured to: (a) in response to the sensing result being YES, control the display unit to display the real-time video of traffic conditions around the vehicle; (b) in response to the sensing result being YES, determine whether it is an appropriate time to open the vehicle door based on the information on current traffic conditions around the vehicle from the information collection unit; and (c) in response to a determination result being NO, control the light prompting unit to issue the light prompt to the passenger.

In some specific embodiments, the glass unit is glass having light emitting and projection functions.

In some optional embodiments, the warning module may further include a sound prompting unit and/or a seat vibration prompting unit.

III. Anti-Collision Warning Method for a Vehicle Door

Figure 9:
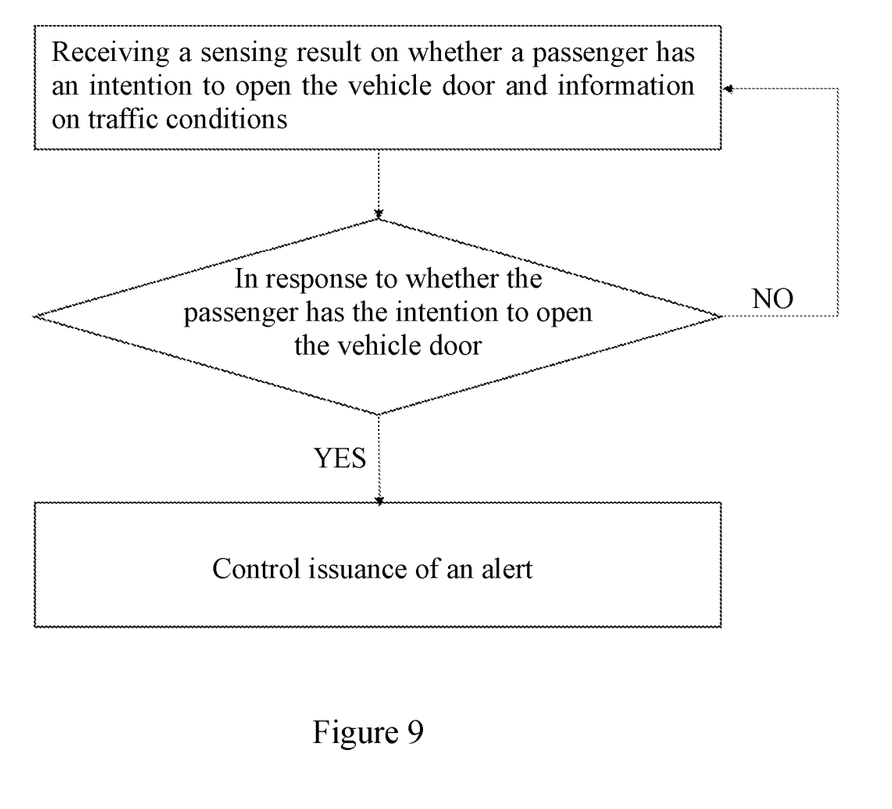
FIG. 9 is a flowchart of an anti-collision warning method for a vehicle door according to an embodiment of the present disclosure.
Figure 10:
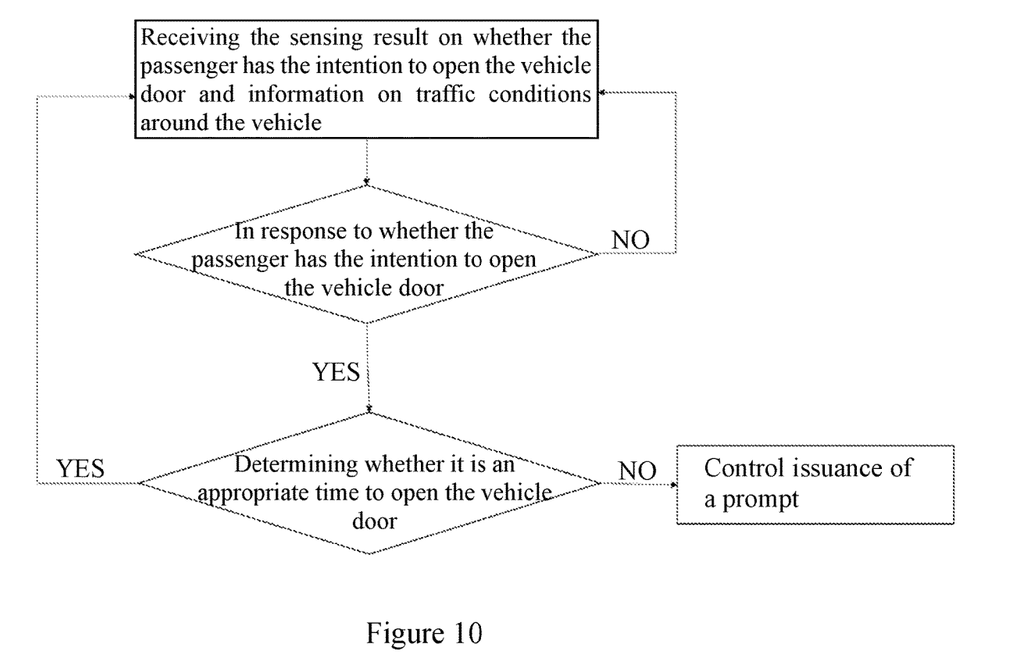
FIG. 10 is a flowchart of an anti-collision warning method for a vehicle door according to another embodiment of the present disclosure.
Figure 11:
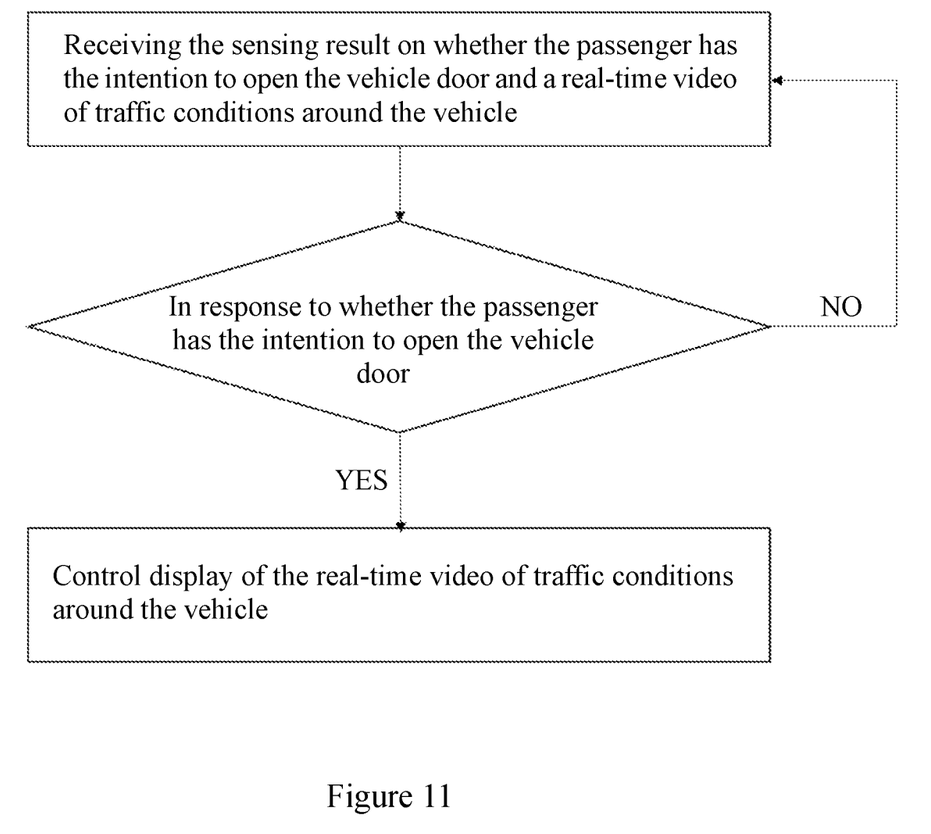
FIG. 11 is a flowchart of an anti-collision warning method for a vehicle door according to another embodiment of the present disclosure.
Figure 12:
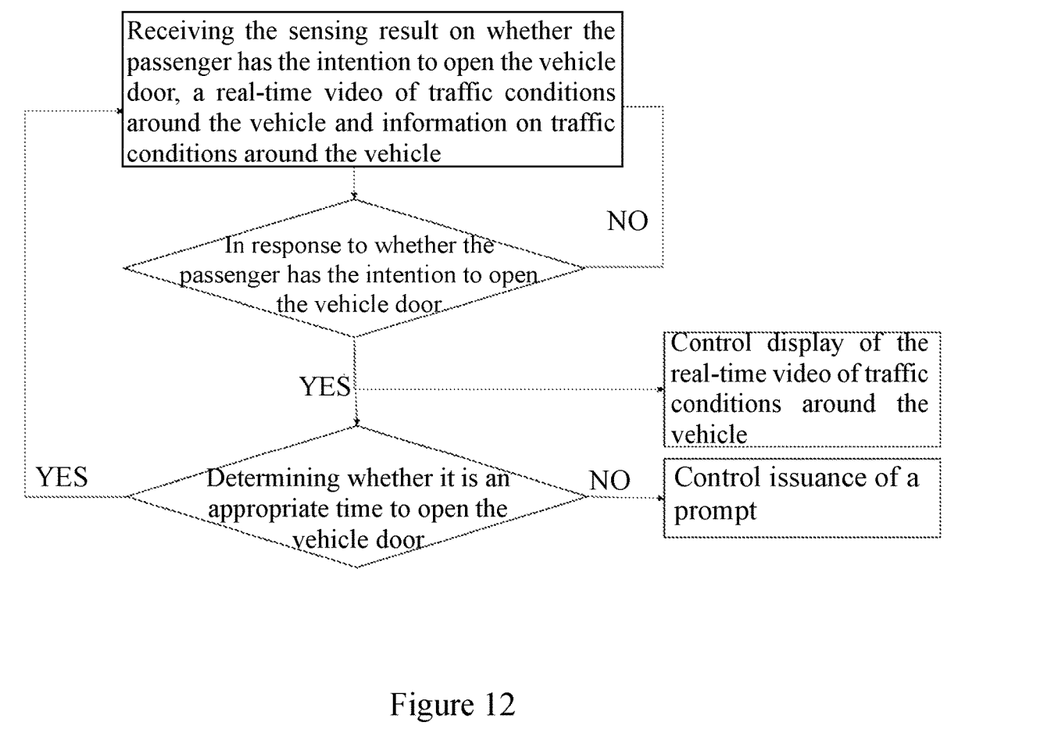
FIG. 12 is a flowchart of an anti-collision warning method for a vehicle door according to another embodiment of the present disclosure.

FIGS. 9 to 12 are flowcharts of an anti-collision warning method for a vehicle door according to the present disclosure. The method is applied to the above-mentioned anti-collision warning system for a vehicle door of the present disclosure. FIG. 9 shows an execution method of the control unit in the anti-collision warning system for a vehicle door shown in FIG. 1. FIG. 10 shows an execution method of the control unit in the anti-collision warning system for a vehicle door shown in FIG. 2. FIG. 11 shows an execution method of the control unit in the anti-collision warning system for a vehicle door shown in FIG. 3. FIG. 12 shows an execution method of the control unit in the anti-collision warning system for a vehicle door shown in FIG. 4.

In some embodiments, in response to the state of the vehicle door being closed, the control module outputs a control instruction to activate the anti-collision warning system for a vehicle door. In some other embodiments, in response to the vehicle speed being lower than a preset speed, the control module outputs a control instruction to activate the anti-collision warning system for a vehicle door.

Referring to FIGS. 1 and 9, after the anti-collision warning system for a vehicle door is activated, the anti-collision warning method for a vehicle door includes the steps of:

receiving a sensing result on whether a passenger has an intention to open the vehicle door and information on traffic conditions; and outputting a control instruction to control issuance of an alert based on the obtained information on current traffic conditions in response to the sensing result being YES.

Referring to FIGS. 2 and 10, after the anti-collision warning system for a vehicle door is activated, the anti-collision warning method for a vehicle door includes the steps of:

receiving a sensing result on whether the passenger has an intention to open the vehicle door and information on traffic conditions around the vehicle;

determining whether it is an appropriate time to open the vehicle door based on the obtained information on current traffic conditions around the vehicle in response to the sensing result being YES; and outputting a control instruction to control issuance of a prompt in response to a determination result being NO.

Referring to FIGS. 3 and 11, after the anti-collision warning system for a vehicle door is activated, the anti-collision warning method for a vehicle door includes the steps of:

receiving a sensing result on whether the passenger has an intention to open the vehicle door and a real-time video of traffic conditions around the vehicle; and outputting a control instruction to control display of the real-time video of traffic conditions around the vehicle in response to the sensing result being YES.

Referring to FIGS. 4 and 12, after the anti-collision warning system for a vehicle door is activated, the anti-collision warning method for a vehicle door includes the steps of:

receiving a sensing result on whether the passenger has an intention to open the vehicle door, a real-time video of traffic conditions around the vehicle and information on traffic conditions around the vehicle;

outputting a control instruction to control display of the real-time video of traffic conditions around the vehicle in response to the sensing result being YES;

receiving the information on traffic conditions around the vehicle and determining whether it is an appropriate time to open the vehicle door based on the obtained information on current traffic conditions around the vehicle in response to the sensing result being YES; and outputting a control instruction to control issuance of a prompt in response to a determination result being NO.

IV. Computer Device

In the present disclosure, the computer device may include: a memory and a processor coupled to the memory. The memory is configured to store instructions executable by the processor, and the processor is configured to execute the instructions stored in the memory to perform various operations and functions described in conjunction with FIGS. 1 to 10.

It should be understood that the computer device is a device having computing capability, such as a computer, a smart phone, or the like. A computer device according to embodiments of the present disclosure may be implemented in hardware or dedicated circuits, software, firmware, logic, or any combination thereof. Some aspects may be implemented in hardware, while other aspects may be implemented in firmware or software which is executable by a controller, a microprocessor or other computer device. In some embodiments, the memory may be a portable computer disk, a hard disk, a random access memory (RAM), read-only memory (ROM), an erasable programmable read-only memory (EPROM or flash memory), an optical storage device, a magnetic storage device, a cloud storage device, or any suitable combination thereof. In some embodiments, the processor may be implemented by a general purpose processor, a digital signal processor (DSP), an application specific integrated circuit (ASIC), a field programmable gate array (FPGA) or other programmable logic device, discrete gate, or any combination of transistor logic and discrete hardware components. The general purpose processor may be a microprocessor, or the processor may be any general processor, controller, microcontroller, or state machine. The processor may be implemented as a combination of computer devices, for example, a combination of a DSP and a microprocessor, multiple microprocessors, a combination of one or more microprocessors and a DSP core, or any other such structure.

V. Computer-Readable Storage Medium

According to the present disclosure, a computer-readable storage medium is provided. The computer-readable storage medium may have instructions (i.e., the above-mentioned elements implemented in the form of software). When the instructions are executed by a machine, the machine performs various operations and functions of various embodiments of the present disclosure.

In this case, the program code itself read from the computer-readable storage medium can implement the functions of any one of the above embodiments. Therefore, the machine-readable code and the readable storage medium storing the machine-readable code constitute part of the present disclosure.

The computer-readable storage medium may include, for example, floppy disks, hard disks, magneto-optical disks, optical disks (i.e., CD-ROM, CD-R, CD-RW, DVD-ROM, DVD-RAM, DVD-RW, DVD-RW), magnetic tapes, non-volatile memory cards and ROMs, and any suitable combination of the above. Alternatively, the program code may be downloaded from a server or a cloud server through a communication network.

Although the specific embodiments of the present disclosure are described above, those skilled in the art should understand that these embodiments are for illustration purposes only, and the protection scope of the present disclosure is defined by the appended claims. Those skilled in the art can make various changes or modifications to these embodiments without departing from the principle and essence of the present disclosure. But these changes and modifications shall fall within the protection scope of the present disclosure.

The invention claimed is:

1. An anti-collision warning system for a vehicle door, comprising:
   a sensing module configured to sense whether a passenger has an intention to open the vehicle door and output a sensing result;
   a detection module configured to collect information on traffic conditions;
   a warning module configured to issue an alert to the passenger; and
   a control module coupled to the sensing module, the detection module and the warning module and configured to control the warning module to issue the alert based on the information on current traffic conditions from the detection module in response to the sensing result being YES,
   wherein the detection module comprises a video capture unit configured to capture a real-time video of traffic conditions around the vehicle,
   wherein the warning module comprises a display unit arranged on door glass or quarter-window glass and configured to display the real-time video of traffic conditions around the vehicle,
   wherein the detection module comprises an information collection unit configured to collect information on traffic conditions around the vehicle;
   wherein the warning module comprises a prompting unit configured to issue a prompt to the passenger; and
   wherein the control module is coupled to the sensing module, the video capture unit, the display unit, the information collection unit, and the prompting unit, and is configured to (a) in response to the sensing result being YES, control the display unit to display the real-time video of traffic conditions around the vehicle, and determine whether it is an appropriate time to open the vehicle door based on the information on current traffic conditions around the vehicle from the information collection unit; and (b) in response to a determination result being NO, control the prompting unit to issue the prompt to the passenger.

2. The anti-collision warning system for a vehicle door according to claim 1, further comprising a door-state monitoring module, wherein an output terminal of the door-state monitoring module is coupled to the control module; the control module is configured to receive monitoring information on a state of the vehicle door from the door-state monitoring module; and the control module is configured to output a control instruction to activate the anti-collision warning system for a vehicle door in response to the state of the vehicle door being closed.

3. The anti-collision warning system for a vehicle door according to claim 1, further comprising a vehicle-speed monitoring module, wherein an output terminal of the vehicle-speed monitoring module is coupled to the control module; the control module is configured to receive monitoring information on vehicle speed from the vehicle-speed monitoring module; and the control module is configured to output a control instruction to activate the anti-collision warning system for a vehicle door in response to the vehicle speed being lower than a preset speed.

4. The anti-collision warning system for a vehicle door according to claim 1, wherein the sensing module is a sensor provided on a door handle.

5. The anti-collision warning system for a vehicle door according to claim 4, wherein the sensor comprises a capacitive proximity sensor and an IR proximity sensor.

6. The anti-collision warning system for a vehicle door according to claim 1, wherein the display unit is a vehicle glass with a projection function.

7. The anti-collision warning system for a vehicle door according to claim 6, wherein the vehicle glass with a projection function is a projection glass or a glass integrated with a display screen.

8. The anti-collision warning system for a vehicle door according to claim 1, wherein the information collection unit is an ultrasonic radar, a millimeter-wave radar, an infrared sensor, or a LiDAR sensor.

9. The anti-collision warning system for a vehicle door according to claim 1, wherein the information on traffic conditions around the vehicle comprises any one or more of the following: presence or absence of an object on a rear side of the vehicle door, distance between the object and the vehicle door, forward speed of the object, and time the object takes to reach the vehicle door.

10. The anti-collision warning system for a vehicle door according to claim 1, wherein the prompting unit is a light prompting unit, a sound prompting unit, or a seat vibration unit.

11. The anti-collision warning system for a vehicle door according to claim 10, wherein the light prompting unit is a luminescent glass.

12. The anti-collision warning system for a vehicle door according to claim 10, wherein the sound prompting unit is an in-vehicle speaker.

13. An anti-collision warning method for a vehicle door applied to the anti-collision warning system for the vehicle door according to claim 1, comprising the steps of:
   receiving a sensing result on whether a passenger has an intention to open the vehicle door and information on traffic conditions;

outputting a control instruction to control issuance of an alert based on the received information on current traffic conditions in response to the sensing result being YES;

receiving the sensing result on whether the passenger has the intention to open the vehicle door, a real-time video of traffic conditions around the vehicle and information on traffic conditions around the vehicle;

outputting a control instruction to control display of the real-time video of traffic conditions around the vehicle and determining whether it is an appropriate time to open the vehicle door based on the received information on current traffic conditions around the vehicle in response to the sensing result being YES; and outputting a control instruction to control issuance of a prompt in response to a determination result being NO.

14. The anti-collision warning method for a vehicle door according to claim 13, comprising the steps of:

receiving monitoring information on a state of the vehicle door, and in response to the state of the vehicle door being closed, outputting a control instruction to activate the anti-collision warning system for a vehicle door; or receiving monitoring information on vehicle speed, and in response to the vehicle speed being lower than a preset speed, outputting a control instruction to activate the anti-collision warning system for a vehicle door.

15. A computer device comprising a memory, a processor and instructions stored in the memory and executable by the processor, wherein the steps of the method according to claim 13 are implemented when the processor executes the instructions.

16. A non-transitory computer-readable storage medium, on which executable instructions are stored, wherein a machine performs the steps of the method according to claim 13 when the executable instructions are executed.

17. A vehicle window glass structure for an anti-collision warning system for a vehicle door, the anti-collision warning system for a vehicle door comprising a sensing module, a detection module, a warning module and a control module, wherein the vehicle window glass structure comprises:

a glass unit configured to issue an alert to a passenger; and
a first interface configured to be coupled to the control module;

wherein the control module is further coupled to the sensing module and the detection module; the sensing module is configured to sense whether the passenger has an intention to open the vehicle door and output a sensing result; the detection module is configured to collect information on traffic conditions; and the control module is configured to control the glass unit to issue the alert based on the information on current traffic conditions from the detection module in response to the sensing result being YES, wherein the detection module comprises a video capture unit configured to capture a real-time video of traffic conditions around the vehicle;

the glass unit comprises a display unit arranged on door glass or quarter-window glass and configured to display the real-time video of traffic conditions around the vehicle; and wherein the detection module comprises an information collection unit configured to collect information on traffic conditions around the vehicle;

wherein the glass unit comprises a light prompting unit configured to issue a light prompt to the passenger; and the control module is coupled to the sensing module, the video capture unit, the display unit, the information collection unit, and the light prompting unit, and is configured to (a) in response to the sensing result being YES, control the display unit to display the real-time video of traffic conditions around the vehicle, and determine whether it is an appropriate time to open the vehicle door based on the information on current traffic conditions around the vehicle from the information collection unit; and (b) in response to a determination result being NO, control the light prompting unit to issue the light prompt to the passenger.

* * * * *